Figures 1, 2:
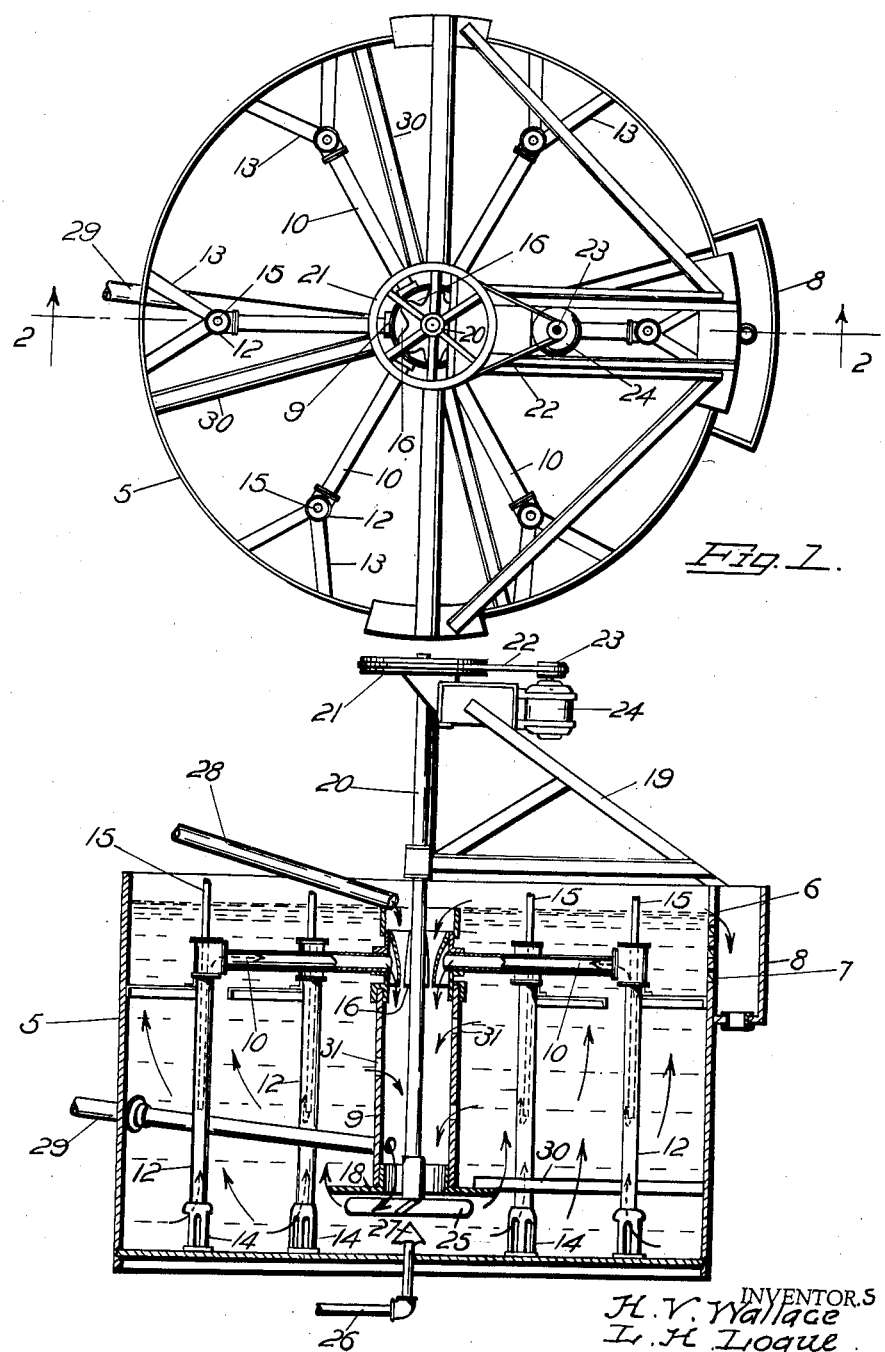

Oct. 3, 1939.    H. V. WALLACE ET AL    2,174,540
METHOD OF ORE TREATMENT
Original Filed Nov. 8, 1932

INVENTORS
H. V. Wallace
I. H. Logue
BY
ATTORNEY.

Patented Oct. 3, 1939

2,174,540

UNITED STATES PATENT OFFICE 2,174,540

METHOD OF ORE TREATMENT

Harry V. Wallace, Kirkland Lake, Ontario, Canada, and Leland H. Logue, Denver, Colo., assignors, by direct and mesne assignments, to Mining Process and Patent Company, a corporation of Delaware Original application November 8, 1932, Serial No. 641,748. Divided and this application July 22, 1935, Serial No. 32,564

9 Claims. (Cl. 261—93)

This invention relates to improvements in methods for agitating and aerating materials that require a thorough mixing or agitation and is a division of our co-pending application, Serial No. 641,748, filed November 8, 1932.

This process is particularly adapted for use in recovering values from finely pulverized or ground ores or concentrates where solids and liquids must be kept in intimate contact and in motion relative to each other for any desired period or where liquids must be aerated or agitated during any process, such as a froth flotation treatment, for example, and is also especially well adapted for use in processes employed for hastening the dissolution of values contained in earthy materials or finely ground ores by chemical means which require aeration or oxidation and is therefore especially valuable in the cyanide treatment of ores.

This process can also be used with equally satisfactory results in chemical leaching.

It is the object of this invention to produce a process for mixing and agitating materials in liquids and which can be carried out by a circulation induced in part by hydrostatic pressure.

An apparatus by means of which this process can be carried out is shown in the accompanying drawing in the several views of which like parts are similarly designated and in which Figure 1 is a plan view of the improved conditioner apparatus; and Figure 2 is a section taken on line 2—2, Figure 1.

The agitator or aerator comprises a cylindrical tank 5 having an overflow 6 above a weir 7, composed of separately removable sections so that the level of the overflow may be varied. Material overflowing the weir passes into a peripheral launder 8.

Suspended in the tank is a system of devices adapted to effect a vertical circulatory movement of matter in the tank, whereby it is readily and thoroughly mixed, or aerated or agitated as the case may be.

The system comprises an open-ended conduit 9 connected adjacent its upper end by means of radiating pipes 10 with a concentric series of vertical tubes 12, which, by means of diverging spider arm-brackets 13, are connected with the circumferential wall of the tank. The open end of the conduit may be placed in the center of the tank or at any other point thereof.

Each of the tubes constitutes an air lift, having at its lower end, adjacent the bottom of the tank, a number of inlets 14. Into the upper end of each tube extends a small pipe 15 connected with a conveniently located source of air under pressure greater than the hydrostatic pressure of the liquid in the tank.

It will be observed that the liquid level, determined by the overflow 6, is above the pipes 10, and there is always sufficient hydrostatic head in the tank to force liquid upwardly through the pipes 12, the introduction of air through pipes 15 serving to augment the pressure of this hydrostatic head and thereby effect a more rapid circulation. Inside the conduit 9 is a series of baffles 16 extending over the openings of the radiating pipes 10 connecting with the air lifts 12.

At the upper end of the conduit is a sliding collar 17, which is adjustable to vary the level of the mouth of the conduit. At the lower end of the conduit is an outwardly extending flange 18. The column 9 has, furthermore, a number of openings 31 at different elevations for the recirculation of material in the tank.

Rotatably supported on a superstructure 19 is a shaft 20 which extends in the axis of the conduit. At the upper end of the shaft is a pulley 21, which, by means of a belt 22, is connected with a driving pulley 23 on the shaft of a motor 24 likewise supported on the superstructure.

At the lower end of the shaft, immediately beneath the flanged lower end of the conduit, is an impeller 25 which in the operation of the device, draws the material downwardly through the conduit. Below the impeller in axial alinement therewith, is an air pipe 26, the end of which is protected against the entrance of material, by a hood 27.

The material to be treated, inclusive of a suitable frothing agent, may be fed into the conduit at the upper end thereof, as through a pipe or launder 28, or adjacent to or at the lower end thereof, as through a pipe or launder 29; or the material may be fed directly into the tank at any part thereof, the main point being the desirability of letting the pulp inflow down the central conduit by centripetal force all around the periphery of the conduit, so that as much air as possible is entrained as the pulp enters the conduit.

The hoods 16 over the openings of the pipes 10 will cause the air-lifted liquid to spray in the shape of a fishtail and will further allow the inflowing liquid, which inflows by centripetal force, to entrain air and carry it down the inside of the wall of the conduit, and between each hood.

In order to further insure the stability of the circulation system, the flange at the lower end of the conduit 9 may be connected to the circumferential wall of the tank by braces 30.

In the operation of the conditioner, material is drawn through the conduit by the rotary impeller which also causes it to move subsequently upwardly in the tank exteriorly of the conduit. Part of the upwardly moving matter is returned into the conduit over the collar 17 and through the inlet opening 31 in a circulatory movement, while other parts of the material are drawn into the lower ends of the tubes 12 and through the tubes and the pipe 10 into the upper end of the conduit, by the air lifts and the hydrostatic head.

Froth accumulating at the surface of liquid in the tank is returned to the conduit across the edge of the collar 17, which performs the function of an adjustable weir, and the finished material is discharged from the tank across the overflow 6, into the launder 8. The return flow of the froth to the conduit is an important feature of the operation.

It will be apparent from the above description that the material fed into the conduit through either or both of the pipes or launders 28 and 29, moves continuously and upwardly outside the same by action of the impeller, and further moves in circulatory currents, through the conduit by means of the tubes 12 and/or the inlets 31 of the conduit. Consequently, the material is constantly maintained in an agitated condition by a continual circulatory movement, through the combined actions of the impeller, the air lifts and the hydrostatic head. The air entering the material through the pipes 15 and/or the pipe 26, also aerates the material in the tank and thereby aids the aeration and agitative action.

The flange 18 at the lower end of the conduit prevents sanding in an upward direction by influence of the impeller, and directs the currents of circulating matter outwardly from the conduit. The adjustable collar 17 regulates the return of froth and other supernatant matter to the conduit, and the multiplicity of air lifts distributed throughout the tank around the central conduit, eliminates the formation of so-called "dead pockets" and insures a constant and uniform movement of the material throughout the greater area of the tank.

The hoods 16 inside the conduit not only separate the circulating matter from the fresh feed, but cause a spraying action and also prevent splitting of the circulating streams as they are discharged into the conduit from the air lifts 12, through the pipes 10 and thus confine the air for useful contact with the solution instead of being dissipated or wasted.

Under certain conditions, the required circulatory mixing action may be obtained by the air lifts individually without connection with the central conduit, but for most materials, the connections between the air lifts and the central conduit by the pipes 10, are desirable.

It is evident that the froth that overflows into the upper end of conduit 9 is subjected to a diffusing action by the impeller 25 and is thoroughly interminged with the contents of the tank during the recirculating process.

Attention is also called to Figure 2 of the drawing which shows that the level of the liquid, which is the same as that of the overflow lip 6, is a considerable distance above pipes 10 and that therefore there is a hydrostatic head which produces a flow of liquid upwardly through pipes 12 whenever the level in conduit 9 is lower than the liquid level in the tank and that this circulation does not require the admission of air through pipes 15.

Attention is furthermore directed to the fact that it is froth, as distinguished from the liquid or pulp that overflows into the conduit 9 and is recirculated and that a portion of the supernatant froth flows into the depressed area within conduit 9 where it is mixed with air and with the stream of air and liquid that emerge from pipes 10 and this mixture is forced into the liquid near its bottom to recirculate and reaerate the same.

Having described the invention what is claimed as new is:

1. The method of conditioning matter in an ore-treating process, which comprises confining a fluid body containing supernatant matter, maintaining a mixing zone open to the atmosphere within the body, forcibly exhausting matter from said zone into the body by mechanical agitation, maintaining confined zones for the return of matter from the sphere of agitation to the mixing zone under hydrostatic pressure in the body, and returning portions of the agitated material to the mixing zone under the influence of the agitation.

2. The method of conditioning matter in an ore-treating process, which comprises confining a fluid body containing supernatant matter, maintaining a mixing zone open to the atmosphere within the body, forcibly exhausting matter from said zone into the body by mechanical agitation, maintaining confined zones for the return of matter from the sphere of agitation to the mixing zone under hydrostatic pressure in the body, introducing air under pressure into said zones to accelerate the return of matter to the mixing zone, and returning portions of the agitated material to the mixing zone under the influence of the agitation.

3. The method of conditioning matter in an ore-treating process, which comprises confining a fluid body containing supernatant matter, maintaining a mixing zone open to the atmosphere within the body, forcibly exhausting matter from said zone into the body by mechanical agitation, maintaining confined zones for the return of matter from the sphere of agitation to the mixing zone under hydrostatic pressure in the body, returning portions of the agitated material to the mixing zone under the influence of the agitation, and overflowing supernatant matter from the surface of the body into the mixing zone.

4. The method of conditioning matter in an ore-treating process, which comprises confining a fluid body containing supernatant matter, maintaining a mixing zone open to the atmosphere within the body, forcibly exhausting matter from said zone into the body by mechanical agitation, maintaining confined zones for the return of matter from beyond the sphere of agitation to the mixing zone under hydrostatic pressure in the body, and returning portions of the agitated material to the mixing zone under the influence of the agitation.

5. The method of conditioning matter in an ore-treating process, which comprises confining a fluid body containing supernatant matter, maintaining a mixing zone open to the atmosphere within the body, forcibly exhausting matter from said zone into the body by mechanical agitation, maintaining confined zones for the return of matter from beyond the sphere of agitation to the mixing zone under hydrostatic pressure in the body, introducing air under pressure into said zones to accelerate the return of matter to the mixing zone, and returning portions of the agitated material to the mixing zone under the influence of the agitation.

6. In an ore-treating process, inclusive of the production of supernatant matter on a fluid body under treatment, the steps of moving the supernatant matter, together with portions of the fluid, through a vortex, beating the mixture so formed during its discharge from the vortex, whereby to break up supernatant matter, and returning portions of the beaten material to the vortex in a confined zone under the influence of air under pressure.

7. In a method of conditioning matter in an ore-treating process in which supernatant matter and air are subjected successively to a vortex action and a beating action in a mixing zone during a circulatory movement within a body of fluid, the step of returning settled matter in the body to the mixing zone through a confined zone under the influence of hydrostatic pressure in the body.

8. In a method of conditioning matter in an ore-treating process in which supernatant matter and air are subjected successively to a vortex action and a beating action in a mixing zone during a circulatory movement within a body of fluid, the step of returning settled matter in the body to the mixing zone through a confined zone under the influence of gas under pressure in the confined zone.

9. In a method of conditioning matter in an ore-treating process in which supernatant matter and air are subjected successively to a vortex action and a beating action in a mixing zone during a circulatory movement within a body of fluid, the step of returning settled matter in the body to the mixing zone through a confined zone under the combined influence of hydrostatic pressure in the body and gas under pressure in the confined zone.

HARRY V. WALLACE.
LELAND H. LOGUE.